Aug. 17, 1948. H. G. EISLER 2,447,240
CONTAINER SUPPORTING AND CLOSING MECHANISM
Filed July 29, 1944 3 Sheets-Sheet 1

INVENTOR
HENRY G. EISLER

Aug. 17, 1948. H. G. EISLER 2,447,240
CONTAINER SUPPORTING AND CLOSING MECHANISM
Filed July 29, 1944 3 Sheets-Sheet 2
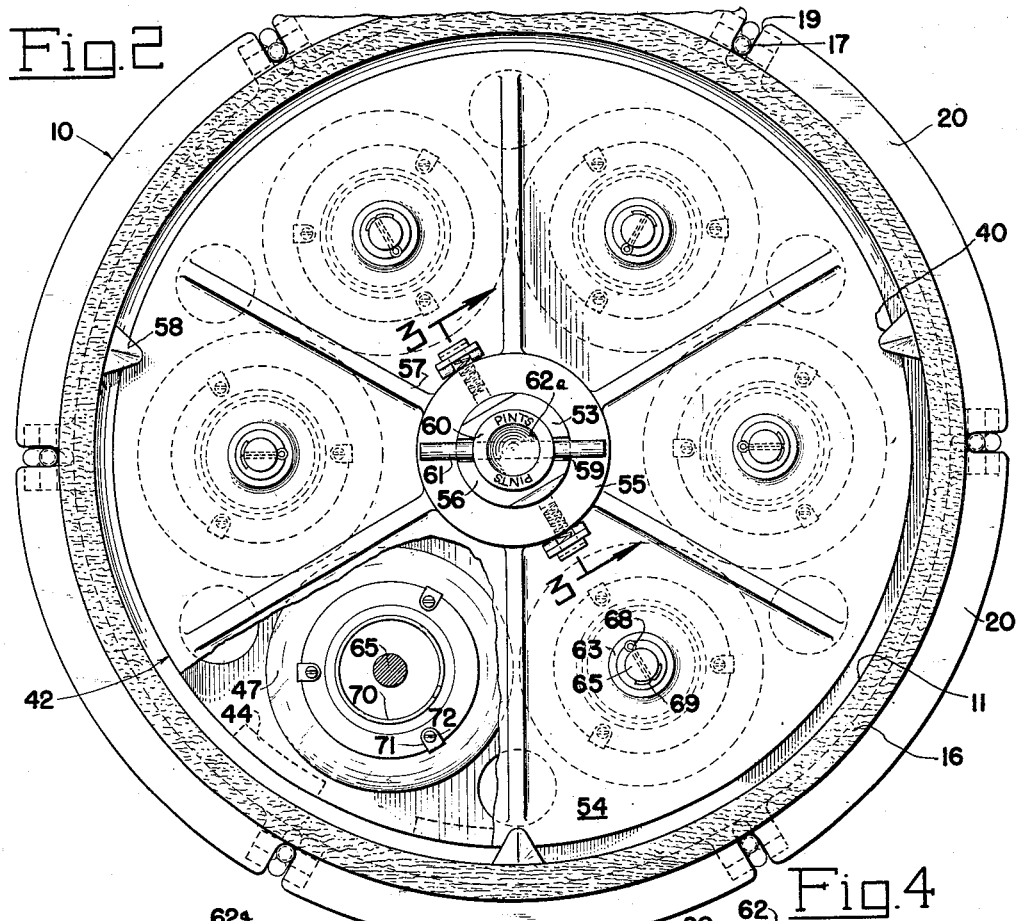
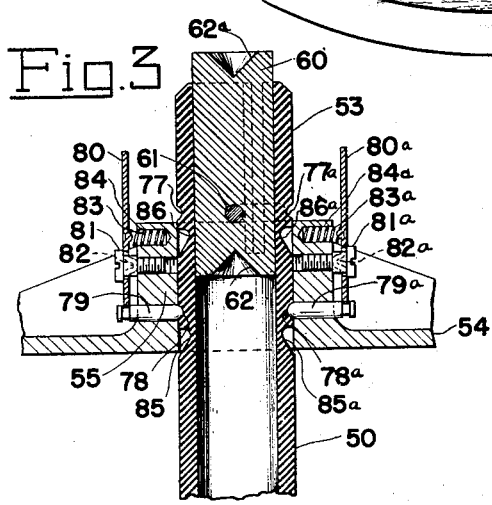
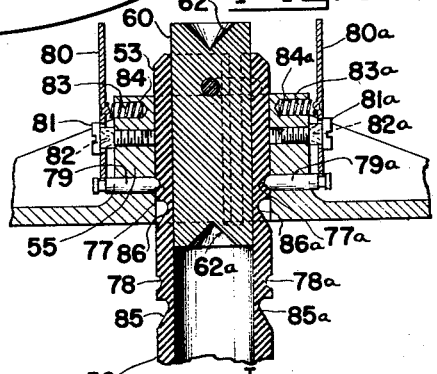
INVENTOR
HENRY G. EISLER
BY
ATT'Y.

Aug. 17, 1948.    H. G. EISLER    2,447,240
CONTAINER SUPPORTING AND CLOSING MECHANISM
Filed July 29, 1944    3 Sheets-Sheet 3
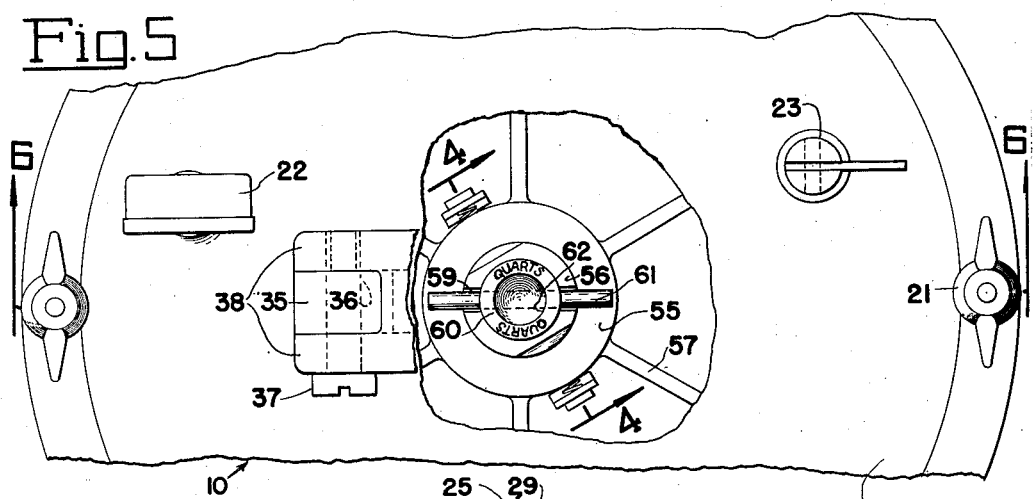
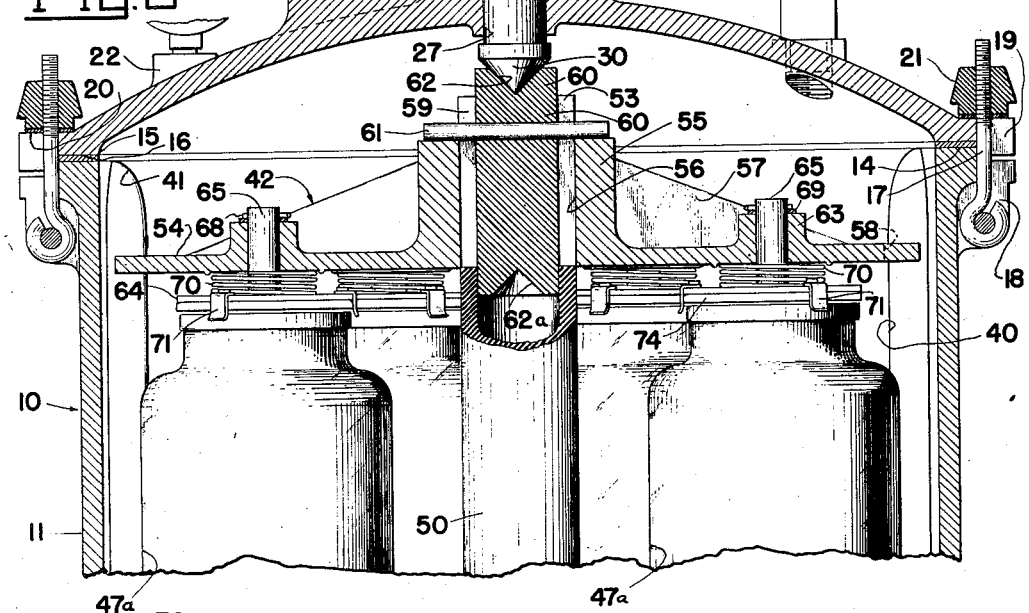
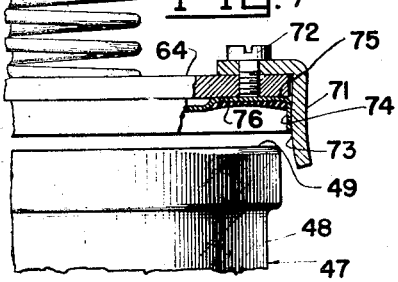
INVENTOR
HENRY G. EISLER
BY Charles M. Hill
ATT'Y.

Patented Aug. 17, 1948

2,447,240

UNITED STATES PATENT OFFICE 2,447,240

CONTAINER SUPPORTING AND CLOSING MECHANISM

Henry G. Eisler, Wilmette, Ill.

Application July 29, 1944, Serial No. 547,215

7 Claims. (Cl. 99—356)

This invention relates to a pressure cooker and more particularly to a pressure cooker provided with novel means for facilitating the handling and treatment of a plurality of containers of the food to be processed, while insuring the safety of the operator.

In accordance with my present invention, a carrier for the individual food containers is so constructed that it may be bodily moved into and out of the pressure cooker and may be so operated while within the pressure cooker as to insure uniformity of processing of the food in each of the individual containers. To accomplish this end, the container carrier is provided with a lower plate for supporting a plurality of the food containers and with an upper plate that is relatively movable and that is capable of being locked in adjusted position to hold the closures for the containers in alignment for sealing the same. The upper, relatively movable member includes individual closure supporting elements that are spring urged toward sealing relationship between the closures and the containers. The construction further includes a lever carried by the cover of the cooker and manually operable from the outside to depress the upper, relatively movable plate and thereby effect the simultaneous sealing of all of the food containers when the proper point in the operation has been reached. In this way uniformity of results is assured.

It is therefore an important object of this invention to provide a pressure cooker of novel and improved construction whereby food in a plurality of individual containers can be handled as a unit and uniformly processed with a minimum of effort and a maximum of safety on the operator's part.

It is a further important object of this invention to provide a pressure cooker having guiding means arranged on the inside thereof, and a carrier for a plurality of containers and the closures therefor, the carrier being so arranged as to cooperate with the guiding means to align the closures with the containers, and means being provided whereby at the proper point in the operation of the cooker the closures can be simultaneously applied to the individual containers to seal the same and thereby insure uniformity of product.

It is a further object of this invention to provide a unit type carrier for simultaneously handling a plurality of individual food containers and adapted to be moved bodily into and out of a pressure cooker without necessitating the separate handling of the individual food containers.

Other and further important objects of this invention will be apparent from the disclosures in the specification and the accompanying drawings.

On the drawings:

Figure 2 is a top plan view, with the cover removed, of the pressure cooker illustrated in Figure 1;

Figure 3 is a fragmentary sectional view taken substantially along the line III—III of Figure 2;

Figure 4 is a fragmentary sectional view taken substantially along the line IV—IV of Figure 5;

Figure 5 is a fragmentary top plan view of the pressure cooker, with portions removed from the cover thereof to show the inside thereof;

Figure 6 is a fragmentary vertical sectional view, with parts in elevation, illustrating the position of certain of the elements when quart-sized containers are used instead of the pint-sized containers illustrated in Figure 1; and Figure 7 is an enlarged fragmentary elevational view of a closure supporting and engaging member, with parts broken away and in section to show details of construction.

Figure 1:
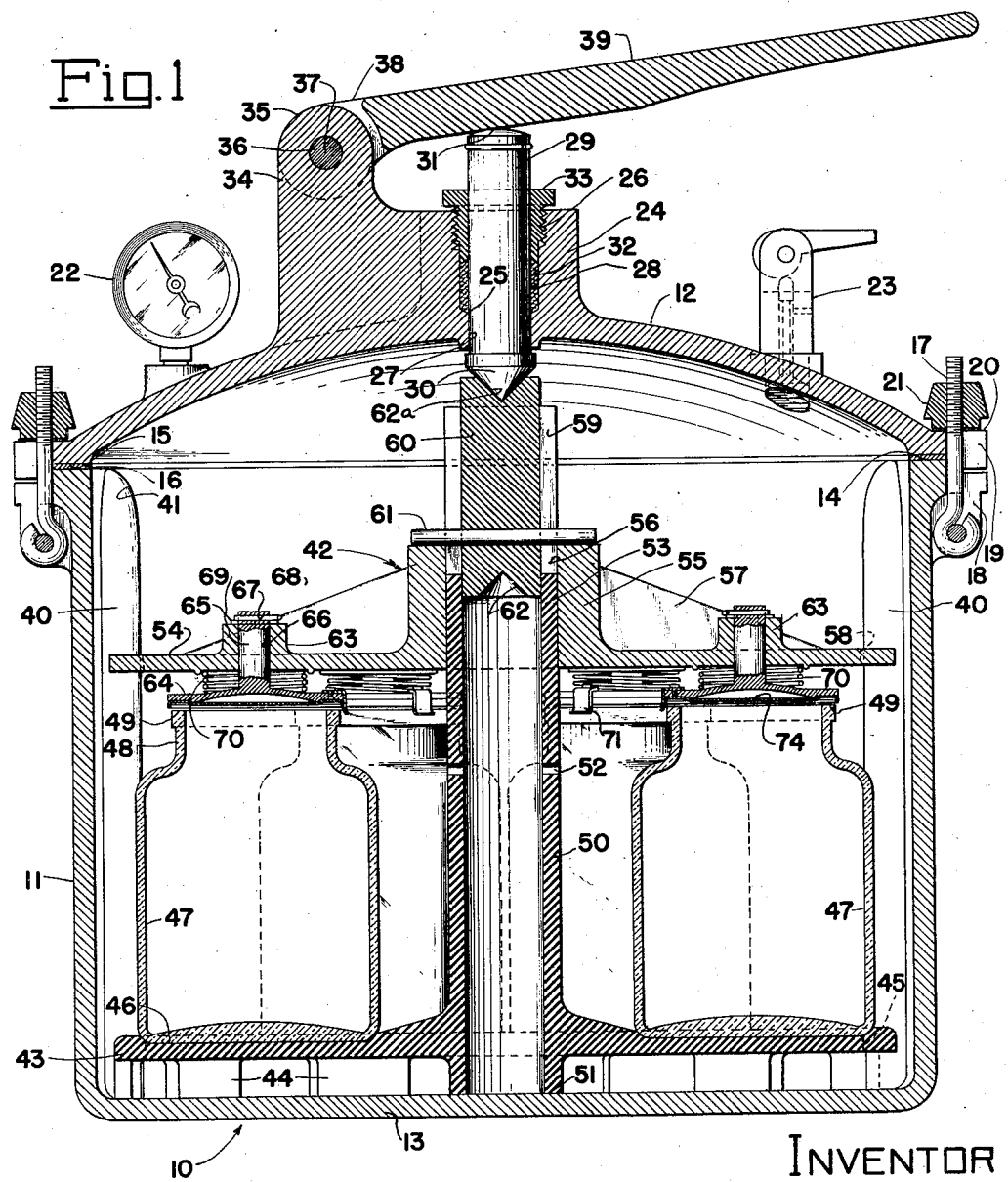
Figure 1 is a vertical sectional view of a pressure cooker embodying the principles of my invention, with parts in elevation.

The reference numeral 10 indicates generally a pressure cooker, comprising a vessel 11 and a cover 12 therefor. Said vessel 11 may be made of cast aluminum or of any other suitable metal or material. As is customary, the vessel 11 is cylindrical in form with a plane bottom wall 13 and a plane upper edge surface 14. The cover 12 is dome-shaped and provided with a lower plane edge 15. Between the edges 14 and 15 a gasket 16 is positioned to seal the vessel when the cover is in place.

The cover is adapted to be clamped in closing position by means of a plurality of swing bolts 17 that are pivotally mounted from lugs 18 integral with said vessel 11. The cover 12 is provided with slots 19 in its peripheral flange 20 for receiving said swing bolts 17. Thumb nuts 21 are carried by the free, threaded ends of said swing bolts 17 and are adapted to be turned down against the peripheral flange 20 to clamp the cover 12 in place. To remove the cover, the thumb nuts 21 are merely turned back sufficiently to permit the swing bolts 17 to be swung out of the slots 19.

A conventional pressure gauge 22 is carried by the cover 12. Said cover 12 is also provided with a vent 23 which serves to permit the escape of air during the heating up stage. Said vent 23 may be provided with means for automatically closing the same when the temperature of the escaping gases reaches a predetermined point.

The cover 12 is also provided with an upstanding centrally positioned boss 24. Said boss is provided with a bore 25 that extends axially therethrough and that is of varying diameters along the length thereof. At its upper end, the bore 25 is enlarged and threaded as at 26. At its lower end the bore 25 is smoothly cylindrical and of reduced diameter, as at 27. Between the upper threaded portion 26 and the lower smooth portion 27, the bore 25 is of an intermediate diameter and formed with a smooth cylindrical wall, as at 28. A pin 29 extends through said bore 25 and is provided at its lower end with a conically shaped head 30, while its upper end projects above the boss 24 and is provided with a smoothly rounded upper face 31. Packing 32 surrounds said pin 29 in the intermediate bore portion 28, and a packing gland 33 is adapted to be threaded into said threaded bore portion 26 against said packing to hold the same tightly in place and effect a seal about the pin 29.

The cover 12 is also provided with an upstanding lug 34, that is adjacent to and may be integrally formed with said boss 24 and the cover 12. At its upper end, the lug 34 has a cylindrical portion 35, through which extends a cylindrical bore 36. A pin 37 is pivotally mounted within said bore 36 and is secured at its outer ends to the bifurcated end 38 of a handle 39. Said handle 39, or lever, is adapted normally to rest upon the upper surface 31 of the pin 29. By depressing the lever 39, the operator can thus depress the pin 29 for a purpose that will later appear.

The vessel 11 is preferably provided on its inner cylindrical wall with a plurality of upstanding guides 40. Said guides 40 may be cast integrally with the body of the vessel 11 or may be separately formed and secured to the inner wall thereof. The upper portions of the guides 40 are smoothly rounded, as at 41 so as to provide a taper toward the inner cylindrical wall of the vessel.

A food container carrier for insertion into the vessel 11 is indicated generally by the reference numeral 42. Said carrier 42 comprises a bottom plate 43 having downwardly extending leg portions 44 for resting upon the inside of the bottom wall 13. Said plate 43 is circular and of lesser diameter than the diameter of the cylindrical portion of the vessel 11 but of greater diameter than the diameter between the inside edges of the guiding ribs 40. Accordingly, said plate 43 is provided with guiding grooves 45 for receiving the guiding ribs 40 when the carrier 42 is moved into or out of the vessel. The plate 43 is also provided with spaced, circular depressions 46 (Fig. 1) for receiving individual containers 47.

As shown, the containers 47 are glass jars, cylindrical in shape and having necks 48 of reduced diameter that terminate in upper plane edge faces 49. It will be understood, however, that cans instead of glass jars, or any other form of receptacle, may be employed. It is not necessary, as will be later pointed out, that glass jars be provided with externally threaded neck portions, since the closures are held in sealing relationship to the containers by the vacuum, or reduced pressure, created within the containers.

The bottom plate 43 is carried by, or formed integrally with, an upstanding cylindrical member 50 that extends into contact with the bottom wall 13, as at 51. Said cylindrical member 50 is provided with a plurality of apertures 52 to permit the escape of steam formed when the water in the bottom of the vessel 11 is heated. Ordinarily, the vessel 11 will be filled with water up to, but preferably not above, the level of the bottom plate 43.

The upper portion of the cylindrical member 50, as at 53 serves as a guide for an upper closure carrying plate 54. Said plate 54 is provided with a central hub portion 55 having a bore 56 therethrough of substantially the same diameter as the outer diameter of the cylindrical guide portion 53 which is received in said bore 56. Strengthening ribs 57 extend radially from the upper portion 55 toward the outer periphery of the upper plate 54, but terminate substantially short of the outer periphery thereof. The outer periphery of said plate 54 is provided with guide slots 58 for receiving the guiding ribs 40.

The upper guide portion 53 of said cylindrical member 50 is provided with diametrically opposed, longitudinally extending slots 59. A cylindrical rod 60 is positioned in the upper end of said cylindrical member 50 and carries a transverse pin 61 that extends through said slots 59.

The cylindrical rod 60 is provided at its opposite ends with identical conical recesses 62 and 62a. When in the position illustrated in Figures 1 to 3, inclusive, the cylindrical rod 60 is of such an effective length as to accommodate the operation of the carrier 42 to pint-sized jars 47. The upper end 62a appropriately carries the legend "pints" (Fig. 2) to indicate to the operator the position of the cylindrical rod 60. When said rod 60 is reversed, the conical depression 62 is uppermost (Figs. 4 to 6, inclusive) and that end bears the legend "quarts" (Fig. 5). The function of said cylindrical rod 60 will become more apparent as the description proceeds.

The upper carrier plate 54 is provided with spaced, upstanding bosses 63, which, when the carrier 42 is in position within the vessel 11, are axially aligned with respect to the depressed portions 46 in the bottom plate 43 and also with respect, of course, to the containers 47. A closure carrying member 64 is provided with an axially upstanding stem portion 65 adapted to be slidable within a bore 66 in a boss 63. The upper end of each of said guiding stems 65 is provided with a transverse opening 67 for the insertion of a retaining pin 68. Said retaining pin 68 rests against a washer 69 that is interposed between said pin and the upper face of a boss 63. A spring 70 surrounds the lower portion of each of the stems 65 and is held under compression between the lower surface of the plate 54 and the upper surface of the closure carrier member 64. Each of the carrier members 64 is thus urged downwardly under the influence of a spring 70, but its downward movement is limited by the retaining pin 68.

As best illustrated in Figure 7, each of the closure carrying members 64 is provided at its periphery with a plurality of spring clips 71, secured at one end by a screw 72. The free end of each of said clips 71 is bowed slightly inwardly as at 73 to engage with the outer rim of a cover or closure 74. Each of said covers or closures 74 has an outer annular recess, or groove, 75 for receiving a resilient gasket 76, which may suitably be formed of rubber and which serves to effect a seal with the upper edge 49 of a container 47. It will be understood that the spring clips 71 serve to releasably retain the closures 74 during the pressure cooking operation.

The upper guide portion 53 of the hollow cylindrical member 50 (Figs. 3 and 4) is provided with a plurality of diametrically opposed depressions, or dimples, 77 and 77a, and 78 and 78a, for receiving a pair of opposed detents 79 and 79a. Said detents 79 and 79a are carried by the free ends of strips 80 and 80a, which are pivotally mounted intermediate their ends in slotted screws 81 and 81a, as at 82 and 82a. Springs 83 and 83a, held under compression within sockets 84 and 84a formed in the boss 55, continually urge the detent members 79 and 79a against the cylindrical member 50. Accordingly, when the sets of dimples 77 and 77a, or 78 and 78a, are passed beneath the ends of the detents 79 and 79a, said ends are pressed into the corresponding dimples by virtue of the action of the springs 83 and 83a. To release the detents 79 and 79a, the free ends of the strips 80 and 80a are pressed inwardly to lift the ends of the detents out of the corresponding dimples. The upper closure carrying plate 54 can thereupon be slipped off of the guiding end 53 of the cylindrical member 50.

The operation of the pressure cooker will now be described.

Before the carrier 42 is introduced into the vessel 11, the containers 47, filled substantially to the top with the food product that is to be processed, are positioned in the depressions 46 in the bottom plate 43. The closures 74 are pressed upwardly for engagement by the spring clips 71 of the individual closure carrier members 64. The upper carrier plate 54 is next slipped over the guiding end 53 of the cylindrical member 50, the detents 79 and 79a being allowed to enter the appropriate dimples for holding the closures 74 in slightly spaced relation above the upper edges 49 of the respective containers 47, as illustrated in Figures 1, 6 and 7. The rod 60, with the proper end up depending upon whether pint or quart containers are being used, is next inserted into the upper slotted end of the cylindrical member 50, with the cross-pin 61 extending through the slots 59 and resting upon the upper end of the boss 55.

The carrier 42, loaded with the filled containers 47, is then lowered into the vessel 11, care being taken to fit the guiding ribs 40 into the slots 45 and 58 formed for the purpose in the peripheral edges of the bottom plate 43 and top plate 54, respectively. In this way, the closures 74 are automatically aligned with the individual containers 47. The cover 12 is next placed on the vessel 11 and the swing bolts 17 moved into position and the nuts 21 tightened down by hand. Prior to putting on the cover 12, the operator should have put a sufficient quantity of water in the bottom of the vessel 11 to come to about the level of the bottom plate 43.

The pressure cooker is then placed over a burner, electrical heating element, or the like, to raise the temperature of the water within the vessel to its boiling point. During this heating period, air and gases are automatically vented through the vent 23. The container closures 74 are held in position adjacent to, but slightly spaced from the upper edges 49 of the containers 47, as illustrated in Figures 1, 6 and 7. This is to permit the cold air to escape from the containers 47 and also to permit the heat to penetrate more rapidly into the contents of said containers 47. The containers 47 should not be so completely filled as to spill over the upper edges 49 during this heating period. If the contents of the containers 47 do spill over, it is likely to interfere with the sealing of the containers.

After the water in the cooker starts to boil, as indicated by the escape of steam from the vent 23, the vent is closed and heating continued until the desired pressure has been built up. The amount of pressure on the gauge 22 should be that required for the particular food being processed, before the heating is discontinued. Since each pressure has a corresponding temperature, there is no necessity for a thermometer in addition to the pressure gauge 22, but a thermometer may, of course, be employed if desired. After the pressure has reached the predetermined figure and has been held for the predetermined length of time, the heating is discontinued and the handle 39 moved downwardly to effect a sealing of the containers 47.

Upon the downward movement of the handle 39, the pin 29 is correspondingly depressed and that, in turn, depresses the rod 60. During continued downward movement of the rod 60, the cross-pin 61 comes into seating engagement with upper edge of the boss 55 (Figs. 1 and 6). Upon further downward movement of the lever 39, the pin 29 and associated rod 60, the cross-pin 61 forces the entire upper plate 54 downwardly until the closures 74 are firmly seated against the upper edges 49 of the respective containers 47. During this further downward movement, the detents 79 and 79a ride out of the corresponding dimples 78 and 78a (Fig. 3) or 77 and 77a (Fig. 4) until the detents reach the next lower set of recesses 85 and 85a (Fig. 3) or 86 and 86a (Fig. 4). The detents thereupon snap into the set of recesses 85 and 85a, or 86 and 86a, which are formed with abruptly curved upper edges and slopingly curved lower edges. The purpose of so forming the recesses 86 and 86a and 85 and 85a, is to facilitate the further downward movement of the detents 79 and 79a out of said recesses, while preventing the disengagement of the detents 79 and 79a upon relative upward movement of said upper plate 54. The detents 79 and 79a can be disengaged from said recesses 85 and 85a, or 86 and 86a, only by manually pressing the free ends of said strips 80 and 80a toward each other.

It will be apparent that the downward movement of the upper plate 54, as just described, effects the simultaneous seal of all of the containers 47 with a uniform pressure. The pressure, it will be observed, is that exerted by the individual springs 70 that are held under compression between the under surface of the plate 54 and the upper surfaces of the closure carrier elements 64. No positive pressure, other than that of the springs 70, is exerted upon said closure carrier elements 64, since the stems 65 thereof are free to move upwardly relative to the plate 54.

After the pressure has dropped to 0 on the gauge 22, the vent is then opened and the wing nuts 21 are loosened and the swing bolts 17 swung out of their slots 19. The cover 12 is then removed. The release of downward pressure on the upper plate 54 may permit slight upward movement of said plate 54 until the detents 79 and 79a become engaged in the recesses 85 and 85a, whereupon further relative upward movement becomes impossible. The rod 60 and pin 61 are then removed and the entire carrier 42 and containers 47 carried thereby are lifted out of the unit. The unit can be set aside until the containers 47 and their contents have cooled sufficiently to make it safe to remove the upper plate 54, or, if the containers 47 are cans, the entire unit can be plunged in a body of cold water to cool down the containers and their contents as rapidly as possible.

The cooling of the contents of the containers 47 will, of course, produce a partial vacuum within said containers above the level of the food product therein. The amount of this vacuum will be substantially the same for all of the containers when at the same temperature, since they have all been sealed under uniform temperature and pressure conditions.

After the containers have cooled sufficiently, the upper plate 54 is removed by manually releasing the detents 79 and 79a and lifting up on the upper carrier plate 54. Said carrier plate 54 is slipped off the upper end of the cylindrical member 50, whereupon the containers 47 can be removed from the bottom plate 43 and packed for shipment or otherwise disposed of. The containers 47 will all be found to be properly and permanently sealed if the operation has been properly carried out.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a pressure cooker including a vessel and a cover therefor, a carrier bodily movable into and out of said vessel, said carrier comprising a plate for supporting a plurality of containers, a relatively movable plate for carrying closures for said containers, members movably supported from said closure carrying plate and releasably engaging said closures, springs acting upon said members to urge said engaged closures toward closing position, and means for moving said closure carrying plate to cause said members to press said closures into sealing relationship with said containers, said means including a reversible member having an element unequally spaced from the ends of said member for engaging said closure carrying plate to provide an effective length in one position for one height of container and an effective length in the reverse position for another height of container.

2. In a pressure cooker including a vessel and a cover therefor, a carrier bodily movable into and out of said vessel, said carrier comprising a plate for supporting a plurality of containers, a relatively movable plate for carrying closures for said containers, members supported from said closure carrying plate and releasably engaging said closures, springs acting upon said members to urge said engaged closures toward closing position and means for moving said closure carrying plate to cause said members to press said closures into sealing relationship with said containers, said means including a reversible member having an element unequally spaced from the ends of said member for engaging said closure carrying plate to provide an effective length in one position for one height of container and an effective length in the reverse position for another height of container, and including a lever carried by said cover and operating through said reversible member to effect said sealing relationship.

3. A pressure cooker comprising a vessel having a closed bottom body portion for containing water to be heated for the generation of steam and having internal vertically extending guides, a support for a plurality of open-ended containers bodily movable into and out of said body portion in cooperation with said guides, said support including a lower platform for supporting said containers, a central upstanding post secured to said platform, an upper plate movably mounted on said post for vertical adjustment thereon, cooperating members on said plate and post for holding said plate in any one of a plurality of vertically adjusted positions, members dependingly supported from said plate for releasably retaining container closures in alignment with said containers and having limited movement toward said containers, and springs urging said members toward the open ends of said containers, a cover for said body portion having a central opening, a pin freely extending through said central opening, a lever pivotally mounted on said cover for movement against said pin, and a connecting element between said pin and upper plate for transmitting a downward force applied by said lever against said pin to depress said upper plate and acting through said springs to force said closures into sealing contact with said container open ends, whereupon said cooperating members on said plate and post act to hold said plate in depressed position with said containers clamped between said plate and said platform so as to be bodily removable with said support as a unit.

4. A container supporting and closing mechanism for use in a pressure cooker, comprising a lower platform for supporting a plurality of open-ended containers, a post secured to said platform and upstanding therefrom, an upper plate slidable upon said post into adjusted position thereon, cooperating members on said plate and post for holding said plate in any one of a plurality of adjusted positions, members supported by said plate for independent limited downward movement therefrom and having resilient elements for releasably retaining container closures, springs urging said members toward the open ends of said containers, and means associated with said post and with said plate including spring urged detents and cooperating notches through which a force may be applied to depress said plate and acting through said springs urge said closures into sealing relationship with the open ends of said containers, whereupon said cooperating members act to hold said plate in depressed position with said containers clamped between said plate and said platform so as to be bodily movable with said support as a unit.

5. In a pressure cooker, an open-topped vessel having vertical guides, a carrier member having elements cooperating with said guides for insertion into and removal from said vessel, said carrier comprising a bottom support for open-ended containers, a post secured to and extending upwardly from said support, an upper plate guided by said post for movement relative to said bottom support and having downwardly movable spring-urged resilient elements releasably carrying covers for said containers, means including a lever on the outside of said vessel and a cooperating movable member on the inside of said vessel operable on actuation of said lever to move said upper plate and bottom support relatively toward each other to compress said springs and urge said covers into sealing contact with said containers and spring actuated detents associated with said upper plate and cooperating with said post for releasably locking said upper plate and bottom support in their relatively changed position to hold said containers clamped therebetween for bodily movement with said carrier.

6. In a pressure cooker including a vessel for containing water to be generated into steam and a cover therefor, a carrier bodily movable into and out of said vessel, said carrier comprising a support for a plurality of open ended containers and a relatively movable support for closures for said containers, individual closure carrying elements mounted on said closure support, springs urging said closures toward closing position, means including a lever carried by said cover and a movable plunger extending inside of said vessel cooperating with said lever and with said closure support for moving said closure support relative to said container support to cause said closures to seal said containers and means on said carrier for releasably locking said closure support relative to said container support when said closures are in said sealing position, whereby upon removal of said cover said carrier and sealed containers can be bodily removed from said vessel and allowed to cool outside of said vessel.

7. In a pressure cooker including a vessel and a cover therefor, a carrier bodily movable into and out of said vessel, said carrier comprising a support for a plurality of open ended containers, an upright post secured to said support and a relatively movable support movable on said post for closures for said containers, individual closure carrying elements mounted on said closure support, springs urging said closures toward closing position, means for moving said closure support relative to said container support to cause said closures to seal said containers and means including spring urged detents carried by said closure support and dimples on said post for reception of said detents for releasably locking said closure support when said closures are in said sealing position.

HENRY G. EISLER.

REFERENCES CITED

The following references are of record in the file of this patent:

UNITED STATES PATENTS

| Number | Name | Date |
| --- | --- | --- |
| 465,393 | Von Skotnicki | Dec. 15, 1891 |
| 529,619 | Hussener | Nov. 20, 1894 |
| 649,012 | Topscott | May 8, 1900 |
| 649,029 | Wright | May 8, 1900 |
| 671,930 | Leffingwell | Apr. 9, 1901 |
| 697,261 | Lees | Apr. 8, 1902 |
| 831,527 | Landsberger | Sept. 18, 1906 |
| 1,908,003 | Williams | May 9, 1933 |
| 1,986,115 | Offenhauser | Jan. 1, 1935 |

FOREIGN PATENTS

| Number | Country | Date |
| --- | --- | --- |
| 20,348 | Great Britain | 1890 |
| 266,735 | Germany | Oct. 30, 1913 |
| 324,011 | France | Nov. 27, 1902 |